United States Patent

Horn et al.

(10) Patent No.: US 8,438,831 B2
(45) Date of Patent: May 14, 2013

(54) PIEZO-RESONANCE IGNITER AND IGNITION METHOD FOR PROPELLANT LIQUID ROCKET ENGINE

(75) Inventors: Mark D. Horn, Granada Hills, CA (US); Thomas M. Walczuk, Oak Park, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1229 days.

(21) Appl. No.: 12/472,326

(22) Filed: May 26, 2009

(65) Prior Publication Data

US 2012/0047871 A1    Mar. 1, 2012

Related U.S. Application Data

(63) Continuation of application No. 11/333,691, filed on Jan. 17, 2006, now Pat. No. 7,565,795.

(51) Int. Cl.
F02C 7/264 (2006.01)
(52) U.S. Cl.
USPC .................................................. 60/39.821
(58) Field of Classification Search .. 60/39.821–39.827, 60/200.1, 212
See application file for complete search history.

(56) References Cited

U.S. PATENT DOCUMENTS

| | | |
|---|---|---|
| 3,630,150 A | 12/1971 | Rakowsky |
| 3,811,359 A | 5/1974 | Marchese et al. |
| 3,854,401 A | 12/1974 | Fisher |
| 3,948,175 A | 4/1976 | Bucklisch |
| 3,948,697 A | 4/1976 | Flanagan et al. |
| 3,954,526 A | 5/1976 | Mangum et al. |
| 3,982,488 A | 9/1976 | Rakowsky et al. |
| 3,994,226 A | 11/1976 | Rakowsky et al. |
| 3,994,232 A | 11/1976 | Rakowsky et al. |
| 4,033,115 A | 7/1977 | Baits |
| 4,036,581 A | 7/1977 | Keyser et al. |
| 4,429,534 A | 2/1984 | Joy |
| 4,441,156 A | 4/1984 | Barbeau |
| 4,488,856 A | 12/1984 | Preble et al. |
| 4,638,173 A | 1/1987 | Milton |
| 4,664,134 A | 5/1987 | Pera |
| 4,697,238 A | 9/1987 | Barbeau |
| 4,697,524 A | 10/1987 | Penner et al. |
| H372 H | 11/1987 | Campbell |
| 4,704,865 A | 11/1987 | Archung |
| 4,711,089 A | 12/1987 | Archung |
| 4,777,793 A | 10/1988 | Weigand et al. |
| 4,800,716 A | 1/1989 | Smith et al. |
| 4,892,037 A | 1/1990 | Betts |
| 4,893,815 A | 1/1990 | Rowan |
| 4,899,956 A | 2/1990 | King et al. |
| 4,912,921 A | 4/1990 | Rice et al. |
| 4,916,904 A | 4/1990 | Ramsaier et al. |
| 4,938,139 A | 7/1990 | Brede et al. |
| 4,953,440 A | 9/1990 | Moscrip |
| 5,022,324 A | 6/1991 | Rice, Jr. |
| 5,052,817 A | 10/1991 | Bement et al. |
| 5,080,305 A | 1/1992 | Stencel |

(Continued)

*Primary Examiner* — Phutthiwat Wongwian
(74) *Attorney, Agent, or Firm* — Carlson, Gaskey & Olds PC (57) ABSTRACT

An ignition system for a combustor includes a resonance system which generates an oscillation pressure force by a resonant flow interaction between two parallel interconnected flow passages which carry an incompressible flow. A piezoelectric system driven by said resonance system. An igniter powered by said piezoelectric system.

7 Claims, 5 Drawing Sheets

U.S. PATENT DOCUMENTS

| | | |
|---|---|---|
| 5,115,638 A | 5/1992 | Reed et al. |
| 5,208,575 A | 5/1993 | Temple |
| 5,214,911 A | 6/1993 | Shekleton |
| 5,271,226 A | 12/1993 | Stone |
| 5,321,327 A | 6/1994 | Jensen |
| 5,431,010 A | 7/1995 | Stone |
| 5,485,788 A | 1/1996 | Corney |
| 5,536,990 A | 7/1996 | Nelson |
| 5,685,504 A | 11/1997 | Schneider et al. |
| 5,694,764 A | 12/1997 | Blain et al. |
| 5,765,361 A | 6/1998 | Jones et al. |
| 5,787,685 A | 8/1998 | Miller, II et al. |
| 6,050,085 A | 4/2000 | Mayer |
| 6,066,898 A | 5/2000 | Jensen |
| 6,082,098 A | 7/2000 | Park et al. |
| 6,199,365 B1 * | 3/2001 | Pretorius et al. ................ 60/776 |
| 6,226,980 B1 | 5/2001 | Katorgin et al. |
| 6,244,040 B1 | 6/2001 | Adzhian et al. |
| 6,244,041 B1 | 6/2001 | Vasin et al. |
| 6,253,539 B1 | 7/2001 | Farhangi et al. |
| 6,255,009 B1 | 7/2001 | Rusek et al. |
| 6,269,630 B1 | 8/2001 | Kreiner et al. |
| 6,272,845 B2 * | 8/2001 | Kessaev et al. ................ 60/212 |
| 6,272,847 B1 | 8/2001 | Dietrich |
| 6,274,945 B1 | 8/2001 | Gilbreth et al. |
| 6,381,949 B1 | 5/2002 | Kreiner et al. |
| 6,446,909 B1 | 9/2002 | Michelson |
| 6,453,937 B1 | 9/2002 | Tobias |
| 6,469,424 B1 | 10/2002 | Marable |
| 6,470,670 B2 | 10/2002 | Maeding |
| 6,505,463 B2 | 1/2003 | Kruse et al. |
| 6,536,208 B1 | 3/2003 | Kretschmer |
| 6,568,171 B2 | 5/2003 | Bulman |
| 6,655,127 B2 | 12/2003 | Kruse et al. |
| 6,664,653 B1 | 12/2003 | Edelman |
| 6,679,155 B1 | 1/2004 | Yaschur et al. |
| 6,758,199 B2 | 7/2004 | Masters et al. |
| 6,769,242 B1 | 8/2004 | Balepin |
| 6,829,899 B2 | 12/2004 | Benham, Jr. et al. |
| 6,880,491 B2 | 4/2005 | Reiner et al. |
| 6,918,243 B2 | 7/2005 | Fisher |
| 6,935,241 B2 | 8/2005 | Hudelmaier et al. |
| 6,959,893 B1 | 11/2005 | Sadowski et al. |
| 6,966,769 B2 * | 11/2005 | Elvander et al. ............... 431/267 |
| 2001/0015063 A1 | 8/2001 | Maeding |
| 2003/0046923 A1 | 3/2003 | Dressler et al. |
| 2004/0148923 A1 | 8/2004 | Hewitt |
| 2004/0148925 A1 | 8/2004 | Knight |
| 2004/0177603 A1 | 9/2004 | Hewitt |

\* cited by examiner

PIEZO-RESONANCE IGNITER AND IGNITION METHOD FOR PROPELLANT LIQUID ROCKET ENGINE

BACKGROUND

The present application is a continuation of U.S. patent application Ser. No. 11/333,691, filed Jan. 17, 2006 now U.S. Pat. No. 7,565,795.

The present disclosure relates to a piezo-resonance igniter system for passive auto ignition of a rocket engine, and more particularly to a method which utilizes the pressure energy in the propellants themselves to excite piezoelectric crystals such that high voltage electrical pulses are created to generate a spark in an igniter system.

Various conventional ignition systems have been used for ignition of a propellant mixture in a combustion chamber of a rocket engine. These ignition systems generally employed a spark induced by an electrical current from a source of electricity and a control for sensing when to supply and discontinue the spark. These conventional systems, although effective, tend to be relatively complex, heavy, and may not provide restart capability.

With the need for safe storable propellant systems such as Gaseous Oxygen (GOx) and Methane combinations, an uncomplicated fully passive auto ignition system is desired to complement the advantages of the safe storable propellants by reducing ignition system complexity, weight, and cost with increased safety and reliability.

SUMMARY

An ignition system for a combustor according to an exemplary aspect of the present disclosure includes a resonance system which generates an oscillation pressure force by a resonant flow interaction between two parallel interconnected flow passages which carry an incompressible flow. A piezoelectric system driven by said resonance system. An igniter powered by said piezoelectric system.

BRIEF DESCRIPTION OF THE DRAWINGS

The various features and advantages of this disclosure will become apparent to those skilled in the art from the following detailed description of the currently preferred embodiment. The drawings that accompany the detailed description can be briefly described as follows.

DETAILED DESCRIPTION

Figure 1:
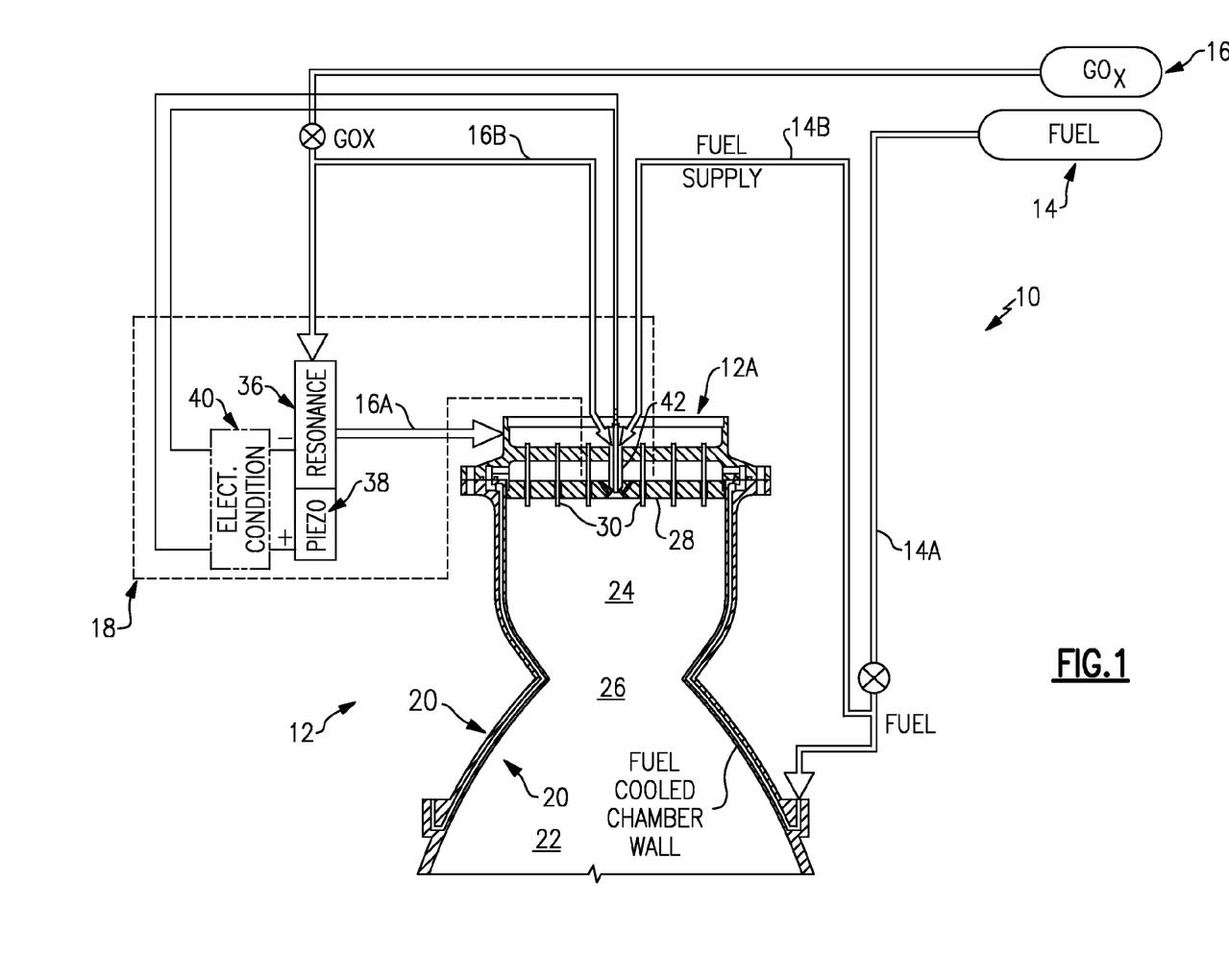
FIG. 1 is a general perspective view an exemplary of rocket engine embodiment for use with the present disclosure.

FIG. 1 illustrates a general schematic view of a rocket engine 10. The engine 10 generally includes a thrust chamber assembly 12, a fuel system 14, an oxidizer system 16 and an ignition system 18. The fuel system 14 and the oxidizer system 16 provide a gaseous propellant system of the rocket engine 10, however, other propellant systems such as liquid will also benefit from present disclosure.

A combustion chamber wall 20 about a thrust axis A defines the nozzle assembly 12. The combustion chamber wall 20 defines a thrust chamber 22, a combustion chamber 24 upstream of the thrust chamber 22, and a combustion chamber throat 26 therebetween. The thrust chamber assembly 12 includes an injector 12A with an injector face 28 which contains a multitude of fuel/oxidizer injector elements 30 (shown somewhat schematically) which receive fuel which passes first through the fuel cooled combustion chamber wall 20 fed via fuel supply line 14A of the fuel system 14 and an oxidizer such as Gaseous Oxygen (GOx) through an oxidizer supply line 16A of the oxidizer system 16.

The ignition system 18 generally includes a resonance system 36 in communication with one of the propellants such as the oxidizer system 16, a piezoelectric system 38, and an electrical conditioning system 40 to power an igniter 42 mounted within the injector 12A to ignite the fuel/oxidizer propellant flow from the fuel/oxidizer injector elements 30. The oxidizer is fed to the igniter via a dedicated line 16B in this embodiment, and the fuel is also fed to the igniter torch via a dedicated line 14B. It should be understood that various propellant flow paths may be usable with the present disclosure so long as at least one propellant flow is in communication with the resonance system 36. Ignition of the fuel/oxidizer propellant flow from the fuel/oxidizer injector elements 30 with the igniter 42 is conventional and need not be described in further detail herein. It should also be understood that while the current focus of this disclosure is a rocket ignition, other applications for power generation and ignition of other combustion based devices will also be usable with the present disclosure.

Figure 2A:
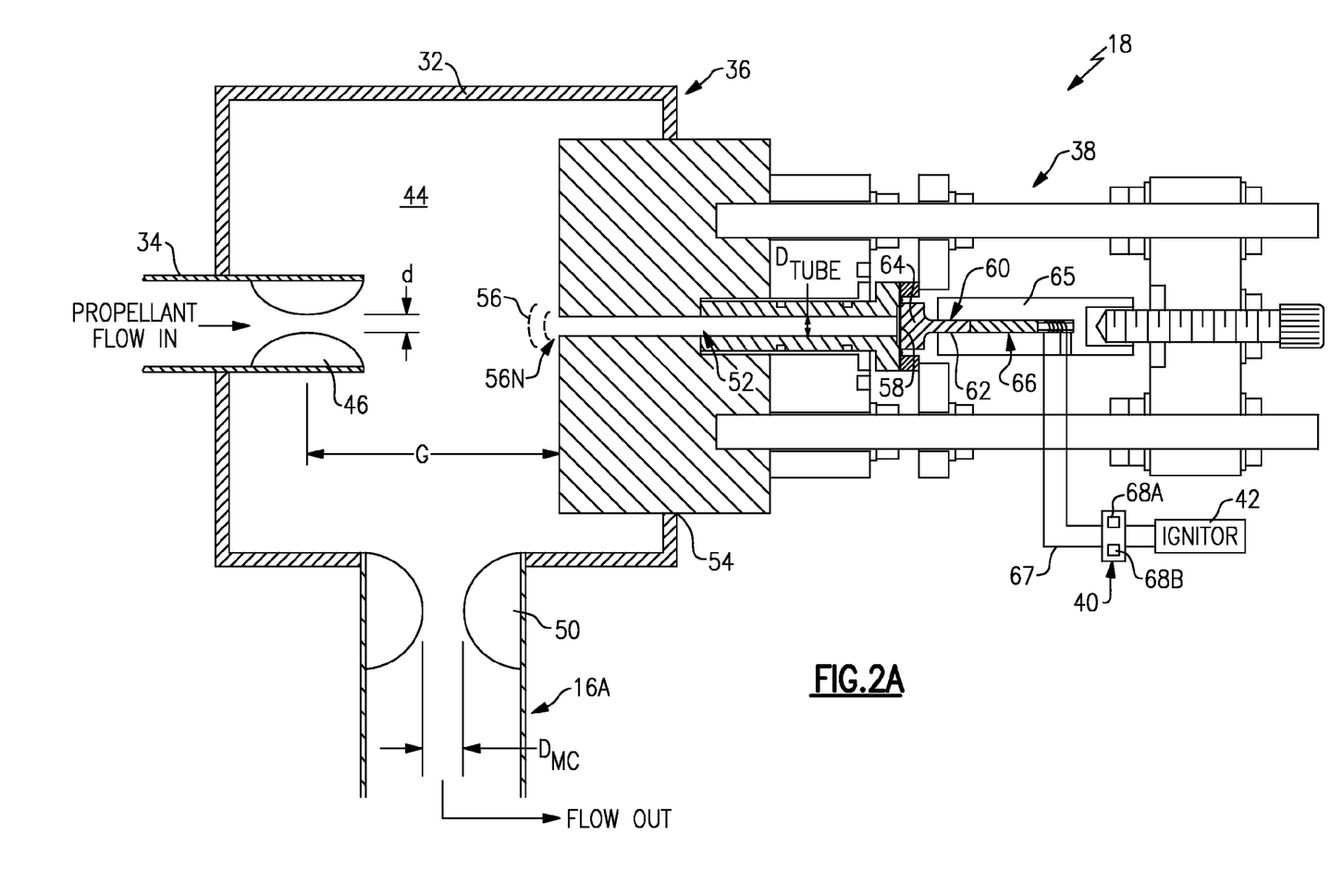
FIG. 2A is a schematic view of an ignition system of the present disclosure.

Referring to FIG. 2A, one ignition system 18 includes a housing 32 which defines a resonance cavity 44 having an inlet 34 incorporating a supersonic inlet nozzle 46 to receive a flow of propellant such as the oxidizer from the oxidizer supply line 16B of the oxidizer system 16. An outlet 16a from the resonance system 36 includes an outlet nozzle 50 to maintain pressure in the resonance cavity 44 at a predetermined level. Although the illustrated embodiment of the oxidizer is a gaseous propellant (compressible flow) resonance configuration, it should be understood that resonant pressure pulses from incompressible liquid flow as well as from other propellant sources will likewise be usable with the present disclosure.

The resonance system 36 is in communication with the piezoelectric system 38 through a gas resonance tube 52. It should be understood that in FIG. 2A the piezoelectric system 38 is illustrated in a schematic form in what may be considered a ground based configuration which may include adjustment features that may or may not be required. That is, other even less complicated piezoelectric systems are achievable as illustrated in the following embodiments.

The gas resonance tube 52 is located through an opening 54 in the resonance cavity 44 opposite the supersonic inlet nozzle 46. The oxidizer entering through the supersonic inlet nozzle 46 as underexpanded flow is directed at the gas resonance tube 52 causing an oscillating detached shock 56 to form upstream of the entrance 56N to the gas resonance tube 52. Reflected shocks within the gas resonance tube 52 couple and reinforce the detached shock 56 and interact with the flow within the gas resonance tube 52 such that the successive cycles of shocks cause the formation of a series of unstable zones of elevated pressure within the gas resonance tube 52. Physical criteria for the interaction may be defined by: "d" the diameter of the supersonic inlet nozzle 46; "G" the distance between the throat of the inlet nozzle 46 and the entrance 56N of the gas resonance tube 52; "Dtube" the internal diameter of gas resonance tube 52 and "DMC" which is the throat diameter of the outlet nozzle 50. A constant diameter gas resonance tube 52 is depicted; however, it is understood that stepped, conical or other shaped resonance tubes may alternatively be utilized with the present disclosure.

Figure 2B:
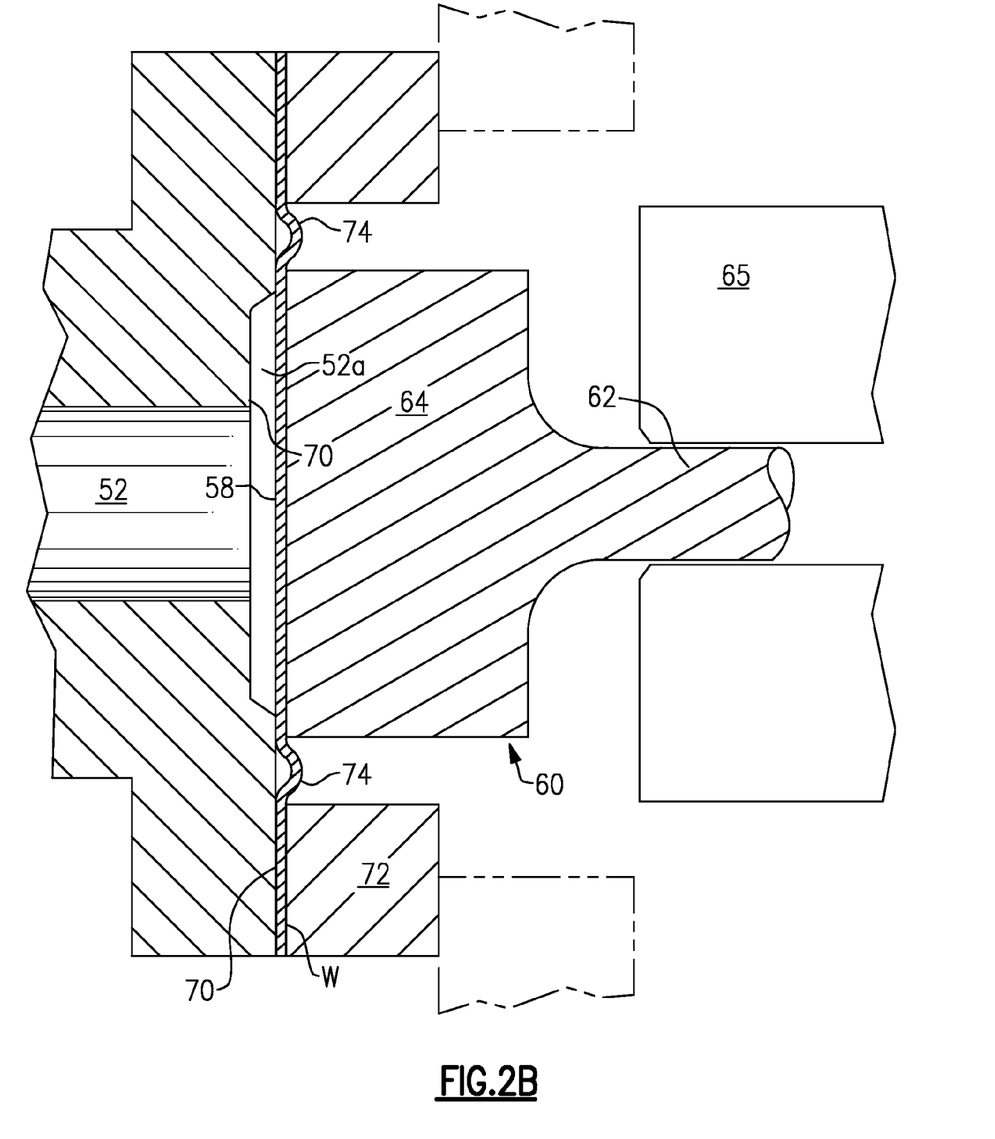
FIG. 2B is an expanded view of the ignition system components illustrated in FIG. 2A.

The gas resonance tube 52 is sealed at an end opposite the entrance 56N with a force transmission diaphragm 58 (also illustrated in FIG. 2B). A force transfer member 60 includes a force transfer rod 62 and a force transfer platen 64 in contact with the force transmission diaphragm 58. The force transfer platen 64 is of a larger diameter than the force transfer rod 62 so as to increase the surface area in contact with the force transmission diaphragm 58 and react pressure loads from the oscillating pressures in the gas resonance tube 52. The sizing of the force transmission diaphragm 58 allows the resonance pressure pulses to act over a relatively large effective area, increasing the net force output for a given gas resonance tube 52 diameter (Dtube) and supply pressure. Flow relief passages 52a (FIG. 2B) may be incorporated into the mating faces of the gas resonance tube 52 and the end segment 70 to increase working fluid transfer across the face of the force transmission diaphragm 58 during the relatively short resonant pressure pulses in the gas resonance tube 52.

The force transfer rod 62 is received within a guide sleeve 65. The guide sleeve 65 contains a piezoelectric crystal stack 66 mounted in contact with the force transfer rod 62. The oscillating pressure force in the gas resonance tube 52 is transmitted to the piezoelectric crystal stack 66 through the force transfer member 60 to generate electrical pulses. The wire harness 67 is connected directly to the igniter 42, eliminating the electrical conditioning system 40. The oscillating force drives the direct spark ignition, in which each pressure pulse results in a spark, offering a persistent source of ignition.

Alternatively or in addition thereto, the electrical pulses are communicated to the igniter 42 through a wire harness 67 and the electrical conditioning system 40. An energy storage system 68A (illustrated schematically) such as an electrical capacitor or battery and a voltage multiplier system 68B (illustrated schematically) within the electrical condition system 40 may condition the spark to a desired spark output energy and frequency independent of the crystal output. This permits the system to be sized to suit any application. In other words, the electrical condition system 40 may include various electrical subsystems such as storage capacitors or voltage amplifiers to specifically tailor the ignition system to provide various outputs.

Since the spark energy production is driven by the resonance of the propellant flow, a fully passive auto-ignition system is provided. When the propellant valves are open, flow through the resonance system 36 is such that resonance occurs and spark energy is created. Once ignition occurs, the resultant backpressure within the combustion chamber 24 (FIG. 1) "detunes" the resonance phenomena and spark production stops. Furthermore, should the engine flame out, spark production automatically resumes as the propellant valves remain open. Control and operation of the rocket engine is considerably simplified by the elimination of separate power supply and switching command systems in the igniter system such that the heretofore typical uncertainties in the spark duration control are obviated. This provides significant advantages for distributed multi-thruster systems, such as an attitude control system (ACS).

Referring to FIG. 2B, the force transmission diaphragm 58 is preferably sandwiched between an end segment 70 of the gas resonance tube 52 and a diaphragm support ring 72 which may be welded together through a weld W or other attachment. The force transmission diaphragm 58 preferably includes a relief feature 74 located between the diaphragm support ring 72 and the force transfer platen 64. The relief feature 74 is preferably a circular flexed portion of the force transmission diaphragm 58 within which the force transfer platen 64 is received. The relief feature 74 minimizes tensile load losses on the force transmission diaphragm 58 thereby enhancing flexibility to maximize transfer of the oscillating pressure force to the force transfer platen 64 and thence to the piezoelectric crystal stack 66 through the force transfer rod 62.

Applicant has demonstrated relatively short ignition delay times of approximately 18 mseconds utilizing a gaseous propellant (compressible flow) resonance configuration. However, multiple approaches exist to achieve the resonant pressure pulses from incompressible liquid flow as well such that the present disclosure is adaptable to any propellants.

Figure 3:
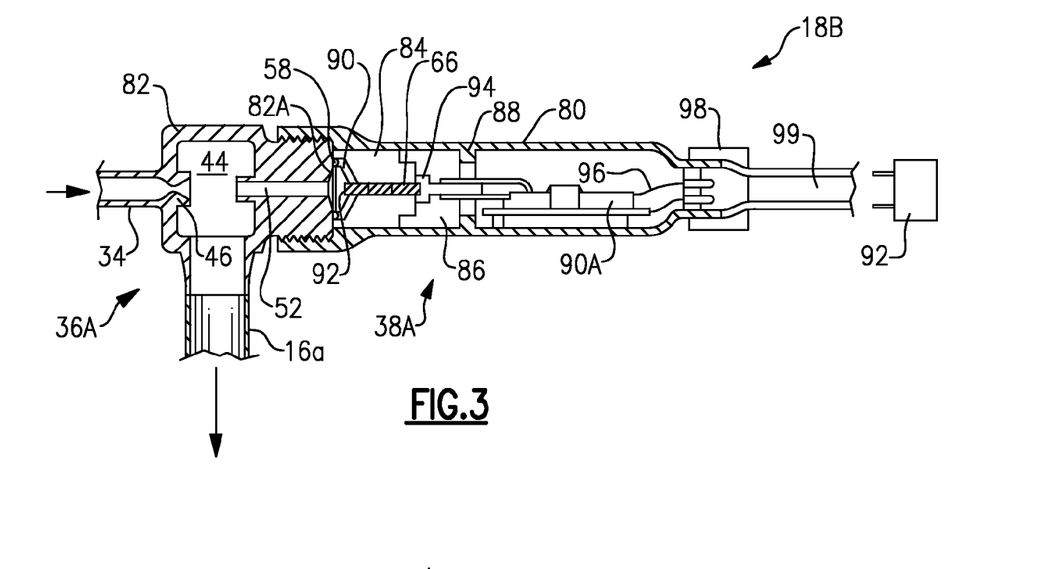
FIG. 3 is a schematic view of a flight ready ignition system of the present disclosure with an indirect piezo-resonance module.

Referring to FIG. 3, another ignition system 18B is illustrated. The resonance system 36A includes a more compact flight-ready piezoelectric system 38A integrated with the resonance system 36A. Such a system is readily mounted anywhere within the communicating conduits of a working fluid system such as embodied by the oxidizer system or fuel system (FIG. 1).

The piezoelectric system 38A includes an electrical condition system 90A to remotely power the igniter 92 (illustrated schematically) mounted within a piezoelectric housing 80. The resonance system 36A includes a resonance housing 82 which defines the resonance cavity 44 therein. Preferably, the resonance housing 82 is threaded to the piezoelectric housing 80 to provide an exceedingly compact and robust system which is readily maintained.

A piezoelectric guide sleeve 84 is interfit with an insulator load reaction interface sleeve 86 and both are mounted within the piezoelectric housing 80 against a stop 88. The force transmission diaphragm 58 is preferably sandwiched between and end segment 82a of the resonance housing 82 which defines the gas resonance tube 52 and the piezoelectric guide sleeve 84. The force transmission diaphragm 58 also includes the relief feature 74 as illustrated in FIG. 2B.

A force transfer member 90 is mounted within the piezoelectric guide sleeve 84 adjacent the force transmission diaphragm 58. The force transfer member 90 is preferably a frustro-conical member in which an apex 92 thereof is located in contact and preferably interfits with the piezoelectric crystal stack 66. That is, the force transfer member 90 essentially combines the force transfer rod 62 and a force transfer platen 64 of the above embodiment, however operation is generally equivalent as the apex 92 is in contact with the piezoelectric crystal stack 66. The oscillating pressure force in the gas resonance tube 52 is transmitted to the piezoelectric crystal stack 66 through the force transfer member 90 to generate electrical pulses in an electrode 94 opposite the piezoelectric crystal stack 66. The electrical pulses from the electrode are communicated to the igniter 42 through the electrical conditioning system 90A via a wire harness 96. The wire harness preferably terminates in a connector 98 which permits removable attachment to a spark power cable 99 such that the system 36A, 38A may be readily replaced during maintenance. As discussed above, since the spark energy production is driven by the resonance of the propellant flow, a fully passive auto-ignition system is provided which is "detuned" when ignition occurs such that spark production automatically stops.

Figure 4:
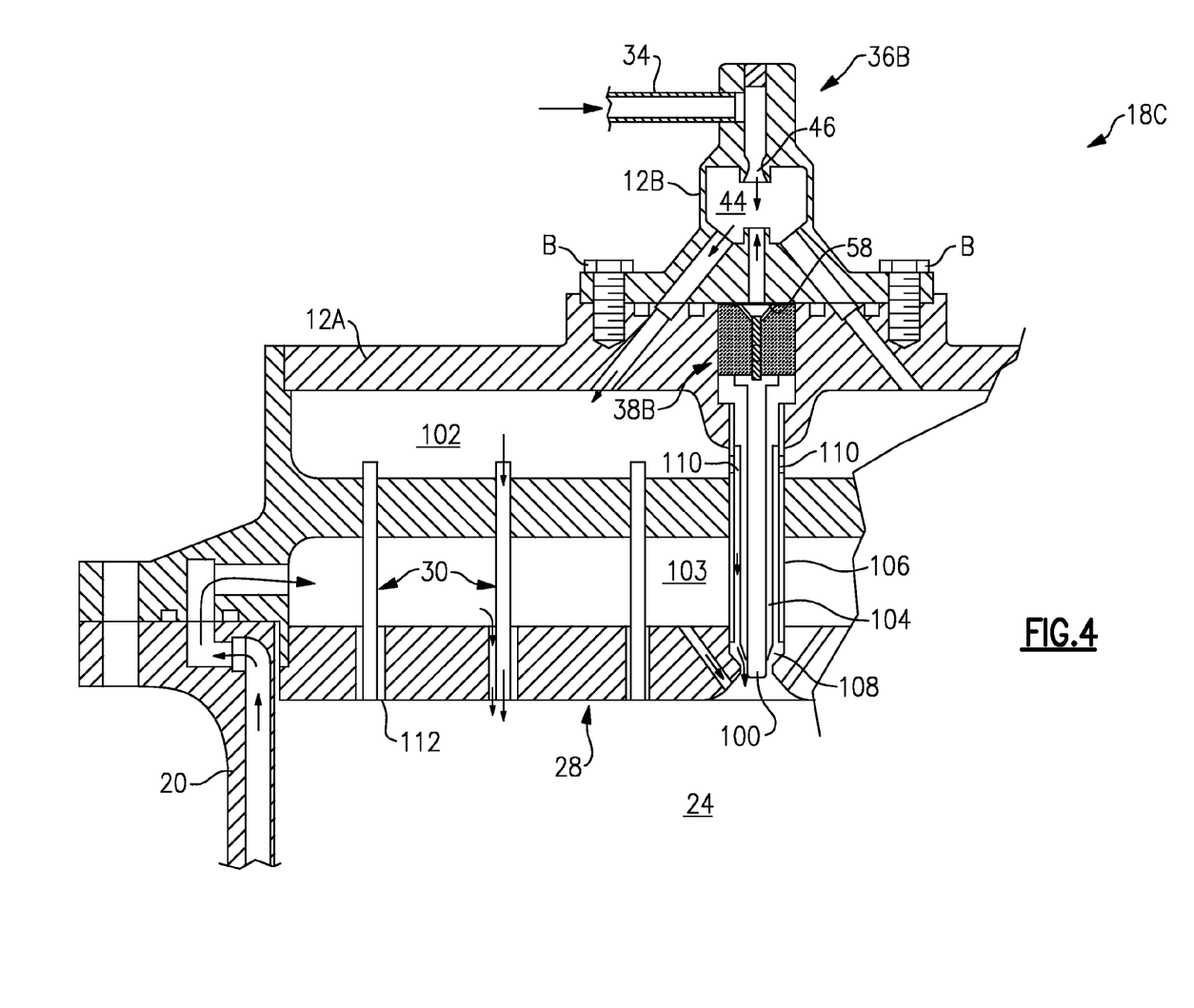
FIG. 4 is a schematic view of a flight ready piezo-resonance module ignition system of the present disclosure utilizing a direct spark torch approach mounted directly within a combustion chamber.

Referring to FIG. 4, another ignition system 18C is illustrated. The resonance system 36B and piezoelectric system 38B are integrated within a combustion chamber 24B as would be preferred for a thruster system as each individual thruster system thereby includes an essentially self-contained ignition system. The resonance system 36B is preferably defined by a resonance housing 12B which defines the resonance cavity 44 therein. The resonance housing 12B is attached directly to the injector 12A through fasteners such as bolts b or the like.

As the FIG. 4 embodiment generally includes components common to that of the previous embodiments, consistent reference numeral usage will be utilized while components more specific to the FIG. 4 embodiment will be described in detail. It will be understood that operation of the FIG. 4 embodiment is generally as the FIG. 3 embodiment, however, the electrode 100 of the FIG. 4 embodiment is mounted to provide a direct spark torch approach. That is, the electrode directly communicates with the combustion chamber 24 through the injector face 28 which contains the multitude of fuel/oxidizer injector elements 30 (shown schematically) which receive fuel from the fuel cooled combustion chamber wall 20 which is fed via fuel supply line 19a of the fuel system 14 and an oxidizer such as Gaseous Oxygen (GOx) through an oxidizer supply line 36a of the oxidizer system 16 (also illustrated in FIG. 1).

The electrode 100 extends through an oxidizer manifold 102 and a fuel manifold 103 to generate a spark within the combustion chamber 24. The electrode 100 is mounted within an insulator load reaction interface 104 which extends along a significant length of the electrode 100. The insulator load reaction interface 104 is interfit with the piezoelectric guide sleeve 84 and retained within the injector 12A. A torch housing 106 is defined about the electrode and the insulator load reaction interface 104 to define a torch oxidizer feed annulus 108.

Oxidizer is communicated form the oxidizer manifold 102 through torch oxidizer inlet ports 110 through the torch housing 106. A multitude of fuel injection ports 112 in communication with the fuel manifold 103 communicate fuel toward the distal end of the electrode 100. Oxidizer and fuel is thereby injected adjacent a distal end of the electrode 100 from which the ignition spark is generated to thereby ignite the mixture within the combustion chamber 24B. As discussed above, since the spark energy production is driven by the resonance of the propellant flow, a fully passive auto-ignition system is provided which is "detuned" when ignition occurs such that spark production automatically stops.

Figure 5:
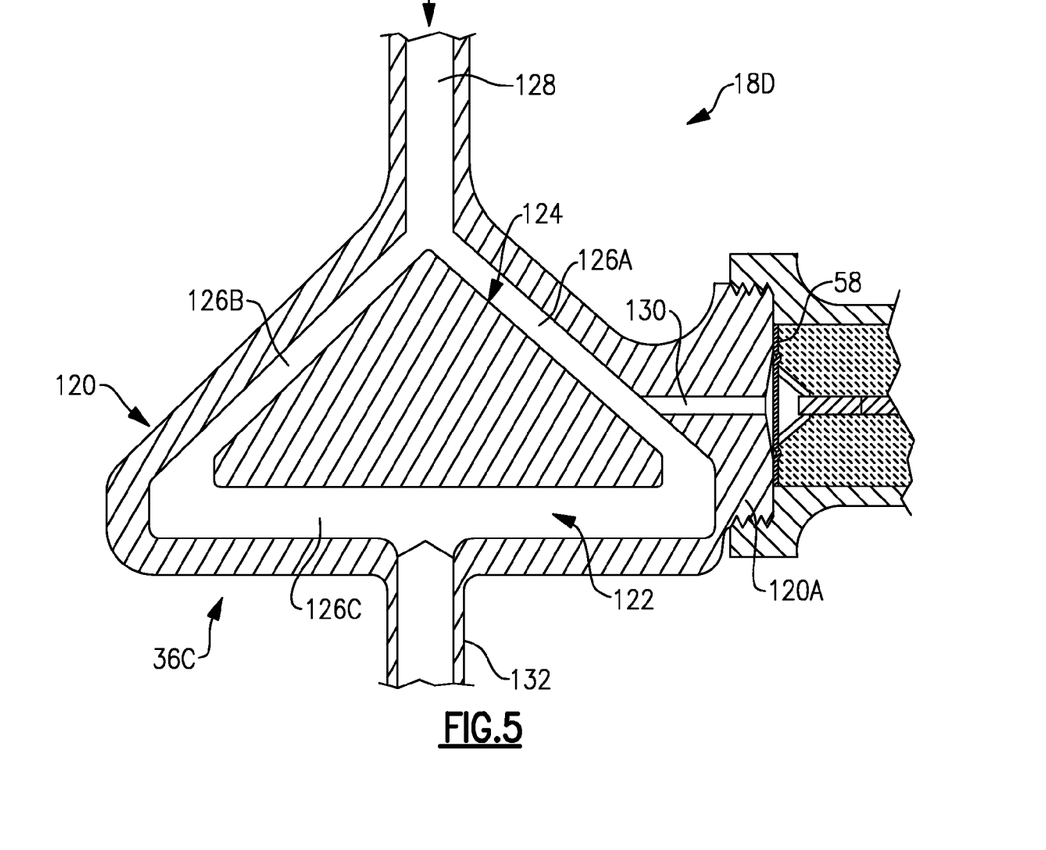
FIG. 5 is a schematic view of a flight ready piezo-resonance module ignition system of the present disclosure for use with an incompressible fluid flow.

Referring to FIG. 5, another ignition system 18D that utilizes an incompressible working fluid such as a liquid propellant is illustrated. The resonance system 36C includes an incompressible fluid resonance housing 120 which defines a resonance cavity 122 therein. Preferably, the resonance housing 120 includes a threaded portion 120A such that a piezoelectric housing 80 and associated piezoelectric system (as disclosed in FIG. 3) is threaded thereto. In other words, the piezoelectric housing 80 and associated piezoelectric system (as disclosed in FIG. 3) is a common system which may be driven by, for example only, either the resonance housing 82 illustrated of FIG. 3 or the incompressible fluid resonance housing 120 illustrated in FIG. 5 to provide an exceedingly compact and robust system.

The incompressible fluid resonance housing 120 includes a split leg resonator 124 having a first leg 126A and a second leg 126B. The legs 126A, 126B split off from an incompressible fluid inlet 128 and rejoin at a common leg 126C to form a generally triangular relationship. It should be understood that other paths will also be usable with the present disclosure. The common leg 126C includes an incompressible fluid outlet 132 which is in communication with a combustion chamber as illustrated in FIG. 1. A gas resonance tube 130 is in communication with the first leg 126A of the split leg resonator 124 to generate an oscillating pressure force within the gas resonance tube 130 due to the unstable flow oscillations between the parallel flowpaths in legs 126A and 126B. The oscillating pressure force generated within the gas resonance tube 130 may then utilized to drive the piezoelectric system as described above.

As discussed above, since the spark energy production is driven by the resonance of the propellant flow, a fully passive auto-ignition system is provided which is "detuned" when ignition occurs such that spark production automatically stops.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant disclosure.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Many modifications and variations of the present disclosure are possible in light of the above teachings. The preferred embodiments of this disclosure have been disclosed, however, one of ordinary skill in the art would recognize that certain modifications would come within the scope of this disclosure. It is, therefore, to be understood that within the scope of the appended claims, the disclosure may be practiced otherwise than as specifically described. For that reason the following claims should be studied to determine the true scope and content of this disclosure.

What is claimed is:

1. An ignition system for a combustor comprising:
a resonance system which generates an oscillation pressure force by a resonant flow interaction between two parallel interconnected flow passages are separated by a split leg resonator which carry an incompressible flow;
a piezoelectric system driven by the oscillation pressure force of said resonance system; and
an igniter powered by said piezoelectric system.

2. The ignition system as recited in claim 1, wherein said split leg resonator having a first leg and a second leg which form a generally triangular relationship.

3. The ignition system as recited in claim 2, wherein a gas resonance tube is in communication with said first leg of said split leg resonator to generate said oscillating pressure force within said gas resonance tube.

4. The ignition system as recited in claim 3, wherein said gas resonance tube is sealed with a force transmission diaphragm, a force transfer member in contact with said force transmission diaphragm.

5. The ignition system as recited in claim 4, wherein said force transfer member includes a force transfer rod and a force transfer platen, said force transfer platen in contact with said force transmission diaphragm.

6. The ignition system as recited in claim 5, wherein said force transfer platen is of a larger diameter than said force transfer rod and the force transfer diaphragm is of larger diameter than said resonance tube.

7. The ignition system as recited in claim 6 wherein said force transfer rod is in contact with a piezoelectric crystal stack of said piezoelectric system.

\* \* \* \* \*